Sept. 25, 1962 J. DVOŘÁČEK 3,056,099
MAGNETOSTRICTIVE TORSIONAL PICK-UP
Filed Jan. 4, 1960

INVENTOR.
Josef Dvořáček
BY

United States Patent Office 3,056,099
Patented Sept. 25, 1962

3,056,099
MAGNETOSTRICTIVE TORSIONAL PICK-UP
Josef Dvořáček, Varnsdorf, Czechoslovakia, assignor to Vyzkumny a zkusebni letecky ustav, Letnany, near Prague, Czechoslovakia
Filed Jan. 4, 1960, Ser. No. 416
Claims priority, application Czechoslovakia Jan. 15, 1959
4 Claims. (Cl. 336—20)

The present invention relates to a magnetostrictive torsional pick-up utilising magnetostrictive properties of ferromagnetic materials for the transformation of mechanical twisting into an electric signal.

There are several hitherto known magnetostrictive pick-ups based on the application of the so called "Wiedemann effect." Said pick-ups are fitted with a ferromagnetic torsional tube coaxially surrounded by a pick-up coil and a toroidal exciting winding fed from a source of alternating voltage. When twisting a torsional tube, a voltage proportional to the introduced twist is induced in the pick-up coil. In all hitherto known pick-ups, the whole twisting moment, by means of which the pick-up is loaded, is transmitted by the torsional tube so that, when sensing twists of great values, the pick-up considered as a whole, and particularly the torsional tube, have to be of an excessive size. The torsional tube of such pick-ups, when being excited, gets extremely warmed by alternating current effect owing to line losses caused by appearing turbulent currents. Great difficulties arise also when designing several pick-ups destined for transformation of twists within a wide range, e.g. when constructing dynamometers for indicating weights within the range of 250 kg.–50t, and even of greater values. It appears practically impossible to design all of the pick-ups so that the input voltage and the output impedance are the same in all cases, and therefore it is not possible to connect all pick-ups to a single registering device.

In the magnetostrictive torsional pick-up according to the present invention, the torsional body fitted with a pick-up coil and a toroidal exciting winding, has its ends fastened to a coaxially arranged outer ferromagnetic tube, which, in turn has ferromagnetic end covers designed for transmission of the twist. A non-magnetic ring is forced between at least one end of the torsional body and the adjacent end of said outer tube. The outer tube transmits the greater portion of the twisting moment, whereas the torsional body itself is twisted by the deformation of said outer tube. In such a manner it may be possible to transmit twists of relatively large values without employing torsional bodies of excessive dimensions. The non-magnetic ring forced between one end of the torsional body and said outer tube, effects a complete screening of the pick-up against the influence of external magnetic fields.

Figure 1:
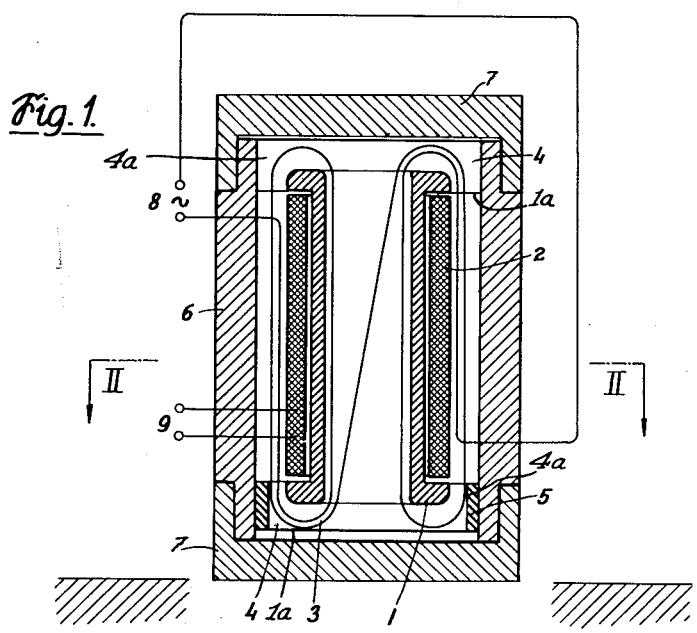
Figure 2:
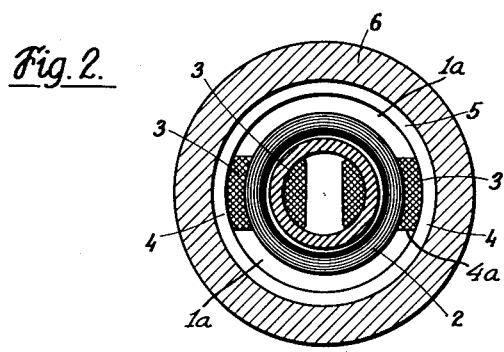

The object of the present invention may be better understood from the following description of a specific illustrative embodiment, when read in connection with the accompanying drawing in which FIG. 1 is an axial sectional view of the pick-up; and FIG. 2 is a transverse sectional view taken along the line II—II on FIG. 1.

The magnetostrictive torsional pick-up embodying the present invention comprises a ferromagnetic torsional body 1 in shape of a tube provided with end flanges 1a having one or more diametrically extending and axially opening recesses 4 in the radial faces thereof communicating with axially directed radially opening recesses 4a in the peripheries of the flanges for receiving the toroidal winding 3. The pick-up coil 2 connected to the pick-up circuit 9 is wound coaxially on the torsional body but free of the latter. When viewed in longitudinal section, said torsional body with said pick-up coil are surrounded by the toroidal winding 3 seated in the recess as 4 and 4a of the end flanges 1a faces. The ferromagnetic tube 6 is coaxially forced onto the circumferential surfaces at the ends of the torsional body. The non-magnetic ring 5 is pressed into one end of tube 6 and around the adjacent end portion of torsional body 1. On the ends of the outer tube 6, there are pressed-on flanges or covers 7 designed for transmission of twist or torque. Said flanges are manufactured of ferromagnetic material. The toroidal exciting winding 3 is connected to the exciting circuit 8.

When twisting the pick-up, a certain amount of twist or torque is transmitted to said torsional body in which a cylindrical alternating magnetic field is generated by the flow of alternating current passing through exciting winding 3. When twisting said torsional body, the cylindrical magnetic field is deformed owing to the influence of magnetostrictive effect so as to comprise a longitudinal component proportional to the twisting. Said longitudinal component of the magnetic field induces an electromotive force in the pick-up coil 2 and is transmitted to the pick-up circuit. Owing to the fact that the outer tube 6 and the flanges or covers 7 are manufactured of ferromagnetic material, and that the non-magnetic ring 5 is pressed into one end of the torsional body 1, the latter, as well as the pick-up coil, are perfectly magnetically screened against the effect of all outer magnetic fields. By selecting the proper size for the outer tube 6, pick-ups which are otherwise uniform may be used for sensing twists or torques in a wide range without changing the input voltage to the pick-ups and the impedance of the latter. This fact permits the use of the same kind of registering mechanism for several pick-ups operating simultaneously and being sensitive to torques in different or successive increments of a wide range. In the case that said outer ferromagnetic tube 6 and said torsional body 1 are made of the same material, the voltage induced in said pick-up does not practically depend on the surrounding temperature, owing to the fact that the variations of the modulus of elasticity of said outer tube and said torsional body are equal for all temperatures and, therefore, the mutual relation between the twist of said outer ferromagnetic tube and said torsional body does not vary in response to temperature changes.

It is also possible to press the non-magnetic ring 5, designed for magnetic screening, onto each of the opposite ends of said torsional body. In using such an embodiment, the screening itself will improve to some extent, but the sensitivity of the pick-up will be diminished due to the impaired functioning of the magnetic circuit.

The magnetostrictive torsional pick-up according to the present invention may be used with advantage in dynamoters, weighing cranes, pick-ups etc., because it permits the construction of a series of pick-ups operating within a wide range of measured values and having equal voltages and impedances at the outputs thereof so as to be adapted to be connected to a single registering apparatus. For this reason the pick-up according to the present invention may appear very interesting not only from the economical, but also from the manufacturing point of view. Moreover the structure of said pick-up is very robust, being at the same time thermally independent and magnetically well screened against influences of outer magnetic fields. For this reason it is suitable for operations carried out in most difficult service conditions.

What I claim is:
1. A magnetostrictive torsional pick-up comprising a ferromagnetic tubular torsional body carrying an exciting winding and a pick-up coil, an outer ferromagnetic tube coaxially containing said torsional body with said winding and coil on the latter, said outer tube being fixed with respect to the opposite ends of said torsional body to transmit a portion of a torsional load applied to the pick-up, and a ring of non-magnetic material pressed be- tween at least one end of said torsional body and the adjacent end of said outer tube.

2. A magnetostrictive torsional pick-up as in claim 1; further comprising ferromagnetic covers pressed onto the opposite ends of said outer tube to transmit torsional loads to the latter.

3. A magnetostrictive torsional pick-up as in claim 1; wherein said torsional body and outer tube are of the same material.

4. A magnetostrictive torsional pick-up as in claim 1; wherein said torsional body has flanges at the ends thereof and said flanges have axially and radially opening recesses in the faces and peripheries thereof; and wherein said pick-up coil is wound coaxially on said torsional body between said flanges, and said exciting winding is toroidal and extends longitudinally through said torsional body and along the outside of the latter and passes through said recesses.

References Cited in the file of this patent
UNITED STATES PATENTS 2,511,178    Roters _____ June 13, 1950